United States Patent
Yoshimoto et al.

(10) Patent No.: US 8,596,425 B2
(45) Date of Patent: Dec. 3, 2013

(54) BRAKE STRUCTURE OF ROTARY TABLE

(75) Inventors: Hiroharu Yoshimoto, Higashiosaka (JP); Jun Matsumoto, Kadoma (JP)

(73) Assignee: Nikken Kosakusho Works, Ltd., Daito-shi (JP)

( * ) Notice: Subject to any disclaimer, the term of this patent is extended or adjusted under 35 U.S.C. 154(b) by 76 days.

(21) Appl. No.: 13/359,725

(22) Filed: Jan. 27, 2012

(65) Prior Publication Data
US 2013/0105255 A1    May 2, 2013

(30) Foreign Application Priority Data

Oct. 28, 2011 (JP) .................................. 2011-237698

(51) Int. Cl.
*B23Q 1/52*         (2006.01)
*F16D 49/14*        (2006.01)

(52) U.S. Cl.
USPC ........................................... 188/74; 188/72.4

(58) Field of Classification Search
USPC ........................ 188/72.4, 151 R, 74; 74/882
See application file for complete search history.

(56) References Cited

U.S. PATENT DOCUMENTS

2011/0023655 A1    2/2011    Tatsuda

FOREIGN PATENT DOCUMENTS

| JP | 2004-074328 | 3/2004 |
|----|-------------|--------|
| JP | 2007-144579 | 6/2007 |
| JP | 2009-248244 | 10/2009 |
| JP | 2010-000590 | 1/2010 |

*Primary Examiner* — Christopher Schwartz
(74) *Attorney, Agent, or Firm* — W. F. Fasse

(57) ABSTRACT

A rotary table includes a brake mechanism capable of providing a large and sufficient brake force. The brake mechanism includes an inner peripheral surface and outer peripheral surface of a sleeve formed coaxially with an axis of a rotatable table, an outer stationary portion provided to a stationary member rotatably supporting the rotatable table and defining an outer hydraulic chamber, and an inner stationary portion provided to the stationary member, arranged radially inward from the outer stationary portion and defining an inner hydraulic chamber. The outer stationary portion is elastically deformed in a radial direction by expansion of the outer hydraulic chamber to push the outer peripheral surface of the sleeve formed on the rotatable table, while the inner stationary portion is elastically deformed in a radial direction by expansion of the inner hydraulic chamber to push the inner peripheral surface of the sleeve formed on the rotatable table.

7 Claims, 2 Drawing Sheets

BRAKE STRUCTURE OF ROTARY TABLE

BACKGROUND OF THE INVENTION

1. Field of the Invention

The present invention relates to a rotary table with a rotatable table, and more particularly to a brake structure, for a rotary table, that clamps a rotatable table to stop the rotation of the rotatable table.

2. Description of the Related Art

A general rotary table includes a rotatable index table, a stationary member (main body) rotatably supporting the rotatable table, a driving mechanism driving the rotatable table, and a brake mechanism clamping the rotatable table so as not to rotate the rotatable table. An example of the brake mechanism is disclosed in Japanese Unexamined Patent Application Publication No. 2009-248244 (FIG. 1). This brake mechanism includes a cylindrical sleeve coaxially provided on the back surface of the rotatable table and a hydraulic chamber formed on the non-rotatable stationary member that faces the inner peripheral surface of the sleeve. Feeding oil into and applying pressure on the hydraulic chamber deform a thin wall, which is part of the stationary member and defines the hydraulic chamber, so as to bulge out and abut against the sleeve.

SUMMARY OF THE INVENTION

However, the aforementioned conventional brake mechanism sometimes cannot provide a sufficient brake force. Especially if a sleeve has a small inner diameter, the inner peripheral surface area of the sleeve is naturally small, which cannot secure a sufficient contact area between the thin wall and the inner peripheral surface of the sleeve. As a result, the rotatable table cannot be securely clamped.

In view of the circumstances, the object of the present invention is to provide a rotary table with a brake mechanism capable of providing a strong and sufficient brake force.

In order to achieve the object, the brake structure of the rotary table according to the present invention includes an inner peripheral surface and an outer peripheral surface that are coaxially formed on a rotatable table, an outer stationary portion that is provided to a stationary member rotatably supporting the rotatable table and defines an outer hydraulic chamber, and an inner stationary portion that is provided to the stationary member, is arranged radially inward from the outer stationary portion and defines an inner hydraulic chamber. Based on these premises, the brake structure is configured such that the outer stationary portion is elastically deformed in a radial direction by expansion of the outer hydraulic chamber to push either one of the inner peripheral surface and outer peripheral surface formed on the rotatable table, while the inner stationary portion is elastically deformed in a radial direction by expansion of the inner hydraulic chamber to push the other peripheral surface formed on the rotatable table. According to the present invention, both the outer stationary portion and inner stationary portion clamp the inner peripheral surface and outer peripheral surface formed on the rotatable table, which generates a large clamping force. Note that the outer hydraulic chamber and inner hydraulic chamber are separately formed.

The radial positions of the inner peripheral surface and outer peripheral surface formed on the rotatable table are not specifically limited. In an embodiment, the outer peripheral surface is formed radially outward and the inner peripheral surface is formed radially inward. For example, the rotatable table is provided with a cylindrical sleeve extending along an axis of the rotatable table and having the inner peripheral surface and outer peripheral surface. The outer stationary portion is arranged to face the outer peripheral surface of the sleeve to push the outer peripheral surface of the sleeve, while the inner stationary portion is arranged to face the inner peripheral surface of the sleeve to push the inner peripheral surface of the sleeve. According to the embodiment, pinching the sleeve with the outer stationary portion and inner stationary portion generates a large clamping force.

The position of the sleeve with respect to the rotatable table and the size of the sleeve are not limited. In an embodiment, an inward flange is formed at an end, on the side of the rotatable table, of the sleeve, and the inward flange includes a radially inner end section secured to the rotatable table. According to the embodiment, the outer diameter or inner diameter of the sleeve can be made larger than the outer diameter of the rotatable table, which provides a larger clamping force. Alternatively, in another embodiment, the sleeve is configured to be secured to the rotatable table without the inward flange to make the outer diameter of the sleeve smaller than the outer diameter of the rotatable table.

The sizes of the outer hydraulic chamber and inner hydraulic chamber in the axial direction are not specifically limited; however, in this description, the outer hydraulic chamber is preferably larger in the axial direction than the inner hydraulic chamber. In the case where an inward flange is formed at an axial end of the sleeve, the inner peripheral surface of the sleeve is configured to be shorter in the axial direction than the outer peripheral surface of the sleeve by the thickness of the inward flange.

According to the embodiment, the sleeve can be effectively sandwiched in a suitable manner for the shape of the sleeve with a large clamping force.

Without limiting to the aforementioned embodiments, the outer peripheral surface formed on the rotatable table may be positioned radially inward, while the inner peripheral surface formed on the rotatable table may be positioned radially outward. For example, the rotatable table is provided with a shaft, which extends along the axis of the rotatable table and includes the outer peripheral surface, and an annular member, which is coaxially arranged with the axis of the rotatable table and includes the inner peripheral surface. The outer stationary portion is arranged to face the inner peripheral surface of the annular member to push the inner peripheral surface of the annular member, while the inner stationary portion is arranged to face the outer peripheral surface of the shaft to push the outer peripheral surface of the shaft. According to the embodiment, both the outer stationary portion and inner stationary portion clamp the inner peripheral surface and outer peripheral surface formed to the rotatable table, thereby generating a large clamping force.

The driving source of the rotatable table is not specifically limited. In an embodiment, the rotatable table can be directly rotated by a drive motor without a reduction mechanism. In another embodiment, the rotatable table can be rotatably driven with a reduction mechanism disposed between the rotatable table and the driving source. The reduction mechanism may be, for example, a worm gear. The worm gear includes a worm wheel coaxially secured to the rotatable table and a worm (screw gear) meshed with the worm wheel. The worm wheel can be placed away from the outer peripheral surface and inner peripheral surface, which are clamped portions, in the axial direction. Alternatively, the worm wheel can be placed so that the axial position of the worm wheel coincides with the axial position of the outer peripheral surface or inner peripheral surface, both of which are clamped portions. In an embodiment, a worm wheel is formed on the outer peripheral surface of the annular member. According to the embodiment, at least one part of the axial position of the worm wheel coincides with the axial position of the inner peripheral surface formed on the rotatable table, thereby shortening the rotary table in the axial direction and making the rotary table thinner.

In an embodiment, the outer stationary portion and inner stationary portion are separated by a circumferential groove, and the rotatable table is provided with a tubular portion that fits in the circumferential groove. According to the embodiment, the tubular portion interposed between the outer stationary portion and inner stationary portion prevents the outer stationary portion from tilting radially inward and prevents the inner stationary portion from tilting radially outward to clamp the rotatable table.

The present invention employs a double-clamping type brake structure in which both the outer stationary portion and inner stationary portion clamp the rotatable table and therefore can hold the rotatable table so as not to rotate by a clamping force larger than that generated by conventional brake structures in which a stationary portion abuts against only an inner peripheral surface of a sleeve. Even if a workpiece chucked on the rotatable table receives a large pressing force from a tool or even if a sleeve has a small inner diameter, the present invention can inhibit the rotation of the rotatable table.

EMBODIMENTS OF THE INVENTION

Figure 1:
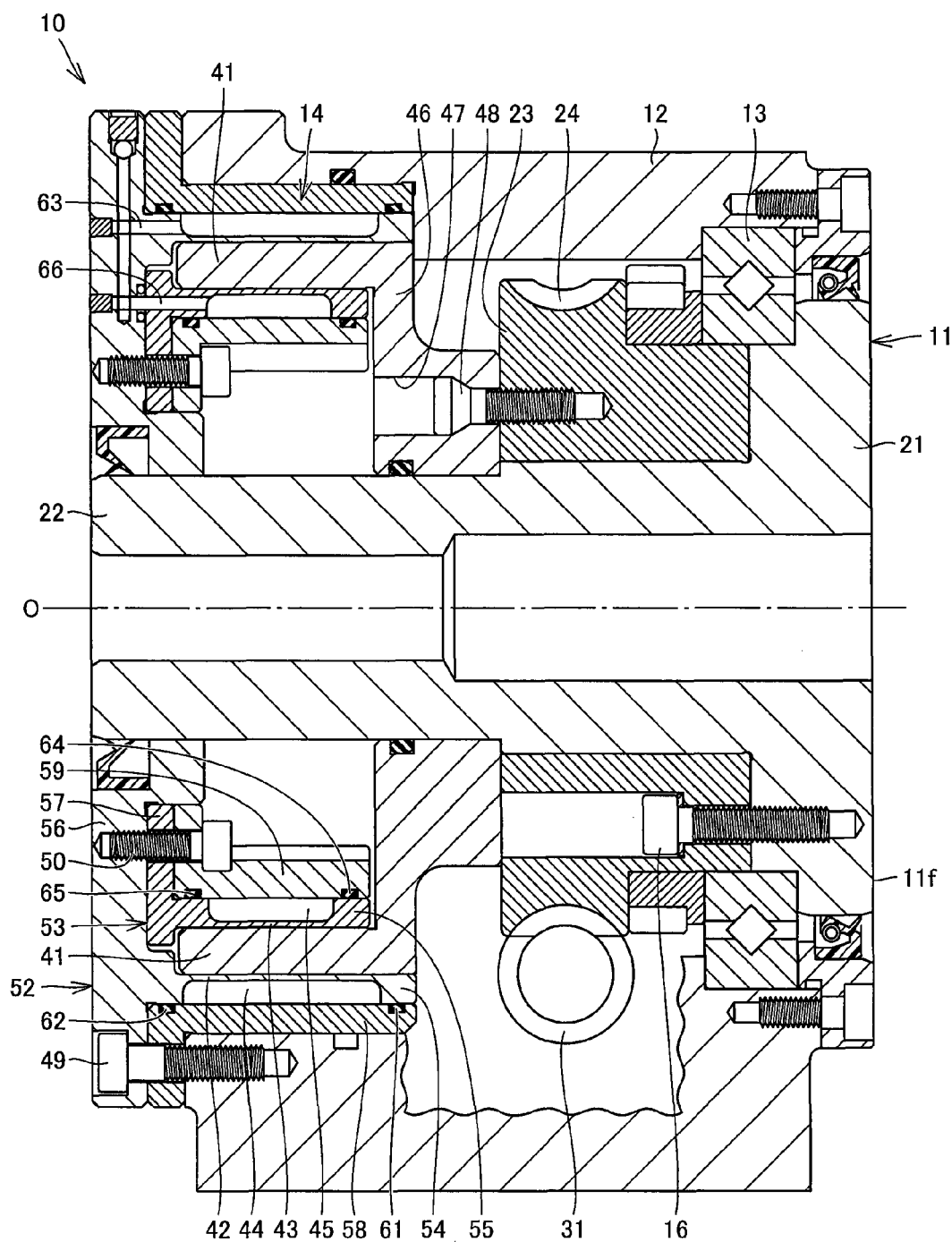
FIG. 1 is a vertical cross-sectional view showing a brake structure of a rotary table according to an embodiment of the present invention.

An embodiment of the present invention will be described in detail below by referring to the drawings.

FIG. 1 is a vertical cross-sectional view showing a brake structure of a rotary table according to the embodiment of the present invention. A rotary table 10 includes a rotatable table 11, a housing 12, a bearing 13 provided between the rotatable table 11 and housing 12, and a brake mechanism 14 provided between the rotatable table 11 and housing 12.

The rotatable table 11 rotates about an axis O indicated by a dashed dotted line in FIG. 1. The rotatable table 11 has a disc-like table portion 21. The table portion 21 has a front surface 11f orthogonal to the axis O to support a workpiece or other machine tools thereon. The rotatable table 11 also has a shaft portion 22 extending from a back surface of the table portion 21 along the axis O.

An annular member 23 is coaxially secured to the back surface of the table portion 21 with bolts 16. The annular member 23 continues along the entire circumference about the axis O and has a worm wheel 24 on its outer peripheral surface. The worm wheel 24 meshes with a worm 31. The worm 31 reduces the rotational speed of a driving source (not shown) and transfers the speed to the worm wheel 24. This rotatably drives the worm wheel 24 to move the rotatable table 11 at a designated index angle.

The housing 12 is a non-rotatable stationary member that forms the contour of the rotary table 10 and rotatably supports the rotatable table 11 with the bearing 13. The bearing 13 is a cross roller bearing centered around the axis O and supports loads in the vertical and radius directions.

The brake mechanism 14 permits or restricts the rotation of the rotatable table 11 and clamps the rotatable table 11 so as not to rotate. Specifically, the brake mechanism 14 includes a sleeve 41 serving as a clamped member coaxially coupled to the back surface of the rotatable table 11, an outer braking member 42 and inner braking member 43 serving as clamping members to make contact with the sleeve 41, an outer hydraulic chamber 44 provided radially outward from the outer braking member 42, and an inner hydraulic chamber 45 provided radially inward from the inner braking member 43.

The sleeve 41 is in the shape of a hollow cylinder and includes an inward flange portion 46 at an end thereof in the axial direction. The inward flange portion 46 has a radially inner end section that is thicker in the direction of the axis O than a radially outer section of the inward flange portion 46. In the radially inner end section of the inward flange portion 46, a plurality of bolt holes 47 are equidistantly formed in a circumference direction about the axis O. Bolts 48 pass through the bolt holes 47 extending in parallel with the axis O. The forward ends of the bolts 48 are threadedly engaged with the annular member 23. The sleeve 41 is thus coupled to the rotatable table 11 with the inward flange portion 46 and the annular member 23. Since the coupling between the sleeve 41 and annular member 23 is made by using the inward flange portion 46, it is possible to make the diameter of the sleeve 41 larger than those of annular member 23 and rotatable table 11.

The outer braking member 42 is part of an annular outer stationary member 52 extending in a circumferential direction about the axis 0. The outer stationary member 52 is a non-rotatable stationary member and includes a tubular portion 54 and a flange portion 56 formed at an end of the tubular portion in the axial direction. The flange portion 56 is secured to the housing 12 with bolts 49. The tubular portion 54 has a circumferential groove that is formed on an outer peripheral surface thereof and defines an outer hydraulic chamber 44, and an external ring 58 is put over the outer peripheral surface of the tubular portion 54 so that the ring 58 covers the circumferential groove. The external ring 58 is also secured to the housing 12 with the bolts 49.

Sealing members 61, 62 are provided at axially opposite ends of the external ring 58, respectively, to make contact with the outer peripheral surface of the tubular portion 54. The sealing members 61, 62 tightly seal the outer hydraulic chamber 44 positioned between the sealing members 61, 62. In the tubular portion 54, an axially middle area in which the circumferential groove (outer hydraulic chamber 44) is formed is thinner than the axially opposite ends in which the circumferential groove is not formed, and the thinner part of the tubular portion 54 serves as the outer braking member 42. An oil passage 63 is formed in the outer stationary member 52. The oil passage 63 has one end connected to the outer hydraulic chamber 44 and the other end connected to a hydraulic power source (not shown).

The inner braking member 43 is part of an annular inner stationary member 53 extending in a circumferential direction about the axis 0. The inner stationary member 53 is a non-rotatable stationary member and includes a tubular portion 55 and a flange portion 57 formed at an end of the tubular portion in the axial direction. The flange portion 57 is secured to the flange portion 56 of the outer stationary member 52 with bolts 50. The tubular portion 55 has a circumferential groove that is formed on an inner peripheral surface thereof and defines an inner hydraulic chamber 45, and an internal ring 59 is attached to the inner peripheral surface of the tubular portion 55 so that the ring 59 covers the circumferential groove. The internal ring 59 is also secured to the flange portion 56 of the outer stationary member 52 with the bolts 50.

Sealing members 64, 65 are provided at axially opposite ends of the internal ring 59, respectively, to make contact with the inner peripheral surface of the tubular portion 55. The sealing members 64, 65 tightly seal the inner hydraulic chamber 45 positioned between the sealing members 64, 65. In the tubular portion 55, an axially middle area in which the circumferential groove (inner hydraulic chamber 45) is formed is thinner than the axially opposite ends in which the circumferential groove is not formed, and the thinner part of the tubular portion 55 serves as the inner braking member 43. An oil passage 66 is formed in the inner stationary member 53. The oil passage 66 has one end connected to the inner hydraulic chamber 45 and the other end extending to the flange portion 56 of the outer stationary member 52 and connected to the oil passage 63 formed in the flange portion 56.

A detailed description will be made about operation of the brake mechanism 14.

When the rotatable table 11 is not clamped, pressure oil is not supplied into the outer hydraulic chamber 44 and therefore the outer braking member 42 does not push the outer peripheral surface of the sleeve 41. Likewise, pressure oil is not supplied into the inner hydraulic chamber 45 and therefore the inner braking member 43 does not push the inner peripheral surface of the sleeve 41. In this state, the rotatable table 11 is permitted to rotate.

To clamp the rotatable table 11, pressure oil is supplied from a hydraulic power source (not shown) via the oil passage 63 to the outer hydraulic chamber 44, while pressure oil is supplied to the inner hydraulic chamber 45 via the oil passage 66 split from the oil passage 63. The supplied pressure oil bulges the outer hydraulic chamber 44 and elastically deforms the outer braking member 42 so as to jut radially inward to the sleeve 41. In addition, the pressing force of the thin outer braking member 42 against the outer peripheral surface of the sleeve 41 becomes strongest at the axially middle area of the outer braking member 42 and decreases toward the axially opposite ends. This is because the outer hydraulic chamber 44 expands the most at the axially middle area thereof and the expansion rate becomes smaller toward the axially opposite ends. Such expansion of the outer hydraulic chamber 44 elastically deforms the outer braking member 42 toward the outer peripheral surface of the sleeve 41 to push the outer braking member 42 against the sleeve 41. Accordingly, the outer braking member 42 damps the motion of the sleeve 41 by frictional action.

At the same time, the inner hydraulic chamber 45 also expands and the inner braking member 43 elastically deforms so as to jut radially outward to the sleeve 41. For the same reason as in the case of the outer braking member 42, the pressing force of the thin inner braking member 43 against the inner peripheral surface of the sleeve 41 becomes strongest at the axially middle area of the inner braking member 43 and decreases toward the axially opposite ends. Such expansion of the inner hydraulic chamber 45 elastically deforms the inner braking member 43 toward the inner peripheral surface of the sleeve 41 to push the inner braking member 43 against the sleeve 41. Accordingly, the inner braking member 43 damps the motion of the sleeve 41 by frictional action.

According to the embodiment, the tubular portion 54, which is an outer stationary portion, elastically deforms in the radius direction due to the expansion of the outer hydraulic chamber 44 and pushes the outer peripheral surface of the sleeve 41 secured to the rotatable table, while the tubular portion 55, which is an inner stationary portion, elastically deforms in the radius direction due to the expansion of the inner hydraulic chamber 45 and pushes the inner peripheral surface of the sleeve 41 secured to the rotatable table 11. Both the outer braking member 42 arranged on a radially outer side and the inner braking member 43 arranged on a radially inner side clamp the inner peripheral surface and outer peripheral surface formed on the rotatable table 11, respectively, thereby providing a large clamping force.

According to the embodiment, the tubular portion 54 is arranged to face the outer peripheral surface of the sleeve 41 and the outer braking member 42 of the tubular portion 54 pushes the outer peripheral surface of the sleeve 41, while the tubular portion 55 is arranged to face the inner peripheral surface of the sleeve 41 and the inner braking member 43 of the tubular portion 55 pushes the inner peripheral surface of the sleeve 41. Thus, the outer braking member 42 and inner braking member 43 pinch the sleeve 41, thereby firmly clamping the rotatable table 11.

According to the embodiment, the outer hydraulic chamber 44 and the inner hydraulic chamber 45, which coincide with each other in terms of their axial positions, compress the sleeve 41, thereby firmly clamping the rotatable table 11. Especially, since this embodiment is configured so that the axial middle position of the outer hydraulic chamber 44 roughly coincides with the axial middle position of the inner hydraulic chamber 45, the outer hydraulic chamber 44 and inner hydraulic chamber 45 can compress the sleeve 41 in the radial direction with the strongest pressing force, thereby generating a large clamping force.

According to the embodiment, the inward flange portion 46 is formed at the end, on the side of the table portion 21, of the sleeve 41 and the radially inner end section of the inward flange portion 46 is secured to the rotatable table 11 with the bolts 48. This configuration makes it possible to increase the diameter of the sleeve 41 in comparison with the case where the sleeve 41 is secured to the rotatable table 11 without the inward flange portion 46. The motion of the sleeve 41 can be reliably damped by using the increased outer peripheral surface area and inner peripheral surface area of the sleeve 41.

According to the embodiment, provision of the inward flange portion 46 to the sleeve 41 makes the outer peripheral surface of the sleeve 41 larger in the axial direction than the inner peripheral surface of the sleeve 41. To conform to the shape of the sleeve 41, the outer hydraulic chamber 44 is formed larger in the axial direction than the inner hydraulic chamber 45. Therefore, the effective use of the axial size difference of the inner and outer peripheral surfaces of the sleeve 41 can appropriately damp the motion of the sleeve 41.

Figure 2:
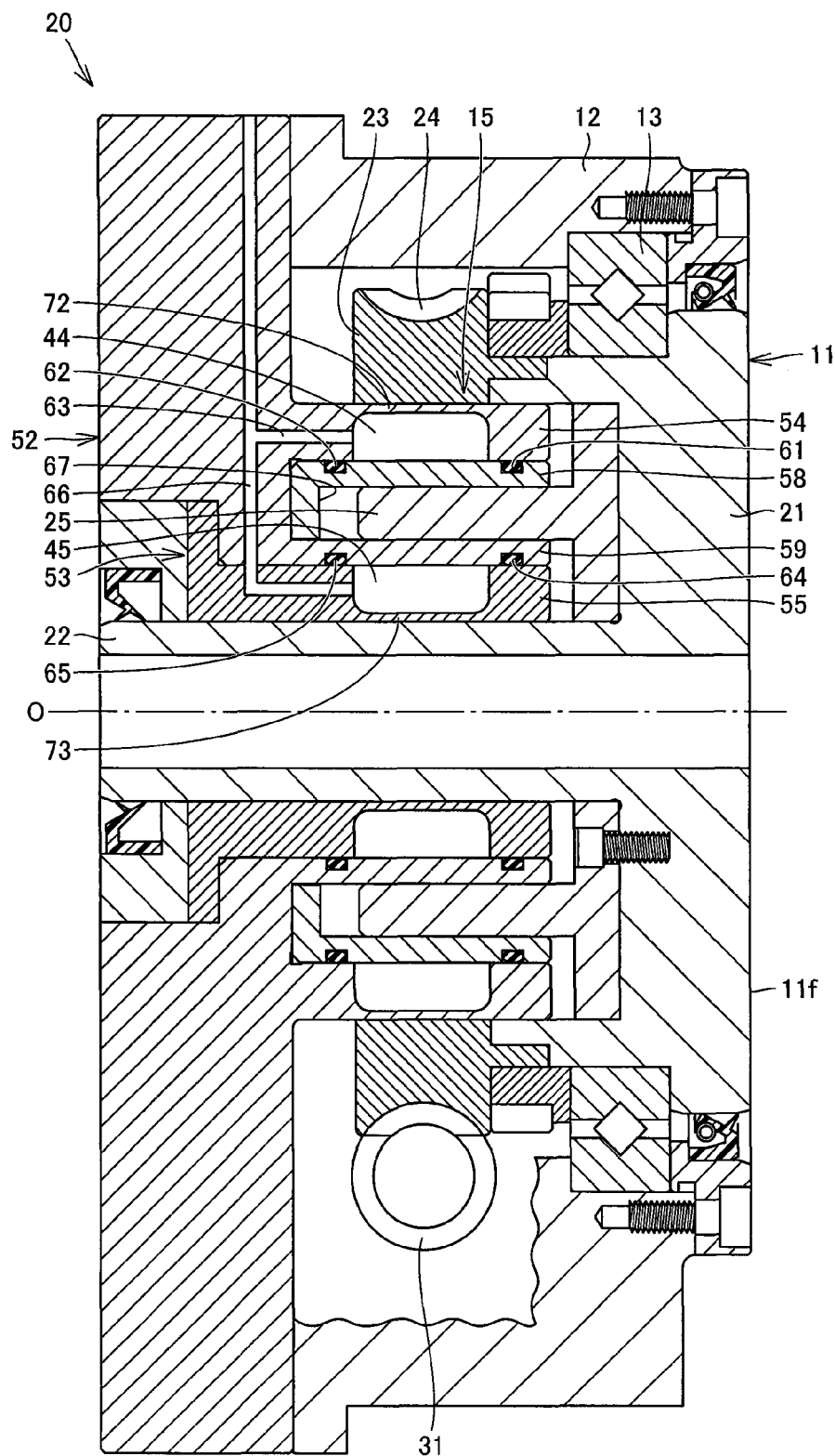
FIG. 2 is a vertical cross-sectional view schematically showing a brake structure of a rotary table according to another embodiment of the present invention.

Next, another embodiment of the present invention will be described. FIG. 2 is a vertical cross-sectional view schematically showing the embodiment of the present invention. Through the embodiment, like components are denoted by like numerals as of the previous embodiment and will not be further explained, but different components will be described below. A rotary table 20 according to the embodiment includes a brake mechanism 15 having an outer braking member 72 and an inner braking member 73.

As shown in FIG. 2, an annular member 23 having a larger diameter than that of a shaft portion 22 has an inner peripheral surface positioned radially outward from an outer peripheral surface of the shaft portion 22. The annular member 23 coupled with the back surface of a table portion 21 has an outer peripheral surface on which a worm wheel 24 is formed and an inner peripheral surface facing the outer braking member 72. An outer hydraulic chamber 44 is disposed radially inward from the outer braking member 72. At least a part of the axial position of the worm wheel 24 coincides with the axial position of the outer hydraulic chamber 44. Properly speaking, the axial middle position of the gear teeth of the worm wheel 24 roughly coincides with the axial middle position of the outer hydraulic chamber 44. The whole axial area of the gear teeth of the worm wheel 24 coincides with the axial area of the outer hydraulic chamber 44.

A tubular portion 54 of an outer stationary member 52 defines the outer hydraulic chamber 44. Specifically, a circumferential groove defining the outer hydraulic chamber 44 is formed on an inner peripheral surface of the tubular portion 54, and an external ring 58 is placed on the inner peripheral surface of the tubular portion 54 so as to cover the circumferential groove. In the tubular portion 54, an axially middle area in which the circumferential groove (outer hydraulic chamber 44) is provided is formed thinner than axially opposite ends in which the circumferential groove is not provided, and the thinner part serves as the outer braking member 72.

The inner braking member 73 faces the outer peripheral surface of the shaft portion 22. An inner hydraulic chamber 45 is formed radially outward from the inner braking member 73. The inner hydraulic chamber 45 is defined in a tubular portion 55 of an inner stationary member 53. As shown in FIG. 2, the inner stationary member 53 is secured in the center of the outer stationary member 52. The tubular portion 55 of the inner stationary member 53 is formed so as to have a diameter smaller than that of the tubular portion 54 of the outer stationary member 52.

More specifically, a circumferential groove defining the inner hydraulic chamber 45 is formed on an outer peripheral surface of the tubular portion 55, and an internal ring 59 is placed on the outer peripheral surface of the tubular portion 55 so as to cover the circumferential groove. In the tubular portion 55, an axially middle area in which the circumferential groove (inner hydraulic chamber 45) is provided is formed thinner than axially opposite ends in which the circumferential groove is not provided, and the thinner part serves as the inner braking member 73.

Between the large-diameter external ring 58 and the small-diameter internal ring 59, as shown in FIG. 2, a circumferential groove 67 is formed. The circumferential groove 67 separates the radially-outside tubular portion 54 from the radially-inside tubular portion 55. A tubular portion 25 is provided to the rotatable table 11 coaxially with the axis 0. The tubular portion 25 is secured to the back surface of the table portion 21 so as to fit in the circumferential groove 67.

A description will be made about operation of the brake mechanism 15.

When the rotatable table 11 is not clamped, pressure oil is not supplied into the outer hydraulic chamber 44 and therefore the outer braking member 72 does not push the inner peripheral surface of the annular member 23. Likewise, pressure oil is not supplied into the inner hydraulic chamber 45 and therefore the inner braking member 73 does not push the outer peripheral surface of the shaft portion 22. In this state, the rotatable table 11 is permitted to rotate.

To clamp the rotatable table 11, pressure oil is supplied from a hydraulic power source (not shown) via an oil passage 63 to the outer hydraulic chamber 44, while pressure oil is supplied to the inner hydraulic chamber 45 via an oil passage 66 split from the oil passage 63. The supplied pressure oil bulges the outer hydraulic chamber 44 and elastically deforms the outer braking member 72, as with the case of the outer braking member 42, so as to jut radially outward to the annular member 23. In addition, the pressing force of the thin outer braking member 72 against the inner peripheral surface of the annular member 23 becomes strongest at the axially middle area of the outer braking member 72 and decreases toward the axially opposite ends. This is because the outer hydraulic chamber 44 expands the most at the axially middle area thereof and the expansion rate becomes smaller toward the axially opposite ends. Such expansion of the outer hydraulic chamber 44 elastically deforms the outer braking member 72 toward the inner peripheral surface of the annular member 23 to push the outer braking member 72 against the annular member 23. Accordingly, the outer braking member 72 damps the motion of the annular member 23 by frictional action.

At the same time, the inner hydraulic chamber 45 also expands and the inner braking member 73 elastically deforms, as with the case of the inner braking member 43, so as to jut radially inward to the shaft portion 22. The pressing force of the thin inner braking member 73 against the outer peripheral surface of the shaft portion 22 becomes strongest at the axially middle area of the inner braking member 73 and decreases toward the axially opposite ends. This is because the inner hydraulic chamber 45 expands the most at the axially middle area thereof and the expansion rate becomes smaller toward the axially opposite ends. Such expansion of the inner hydraulic chamber 45 elastically deforms the inner braking member 73 toward the outer peripheral surface of the shaft portion 22 to push the inner braking member 73 against the shaft portion 22. Accordingly, the inner braking member 73 damps the motion of the shaft portion 22 by frictional action.

According to the embodiment shown in FIG. 2, the tubular portion 54, which is an outer stationary portion, is arranged to face the inner peripheral surface of the annular member 23 so that the outer braking member 72 of the tubular portion 54 pushes the inner peripheral surface of the annular member 23, while the tubular portion 55, which is an inner stationary portion, is arranged to face the outer peripheral surface of the shaft portion 22 so that the inner braking member 73 of the tubular portion 55 pushes the outer peripheral surface of the shaft portion 22. Thus, both the outer braking member 72 arranged on a radially outer side and the inner braking member 73 arranged on a radially inner side clamp the inner peripheral surface and outer peripheral surface formed on the rotatable table 11, respectively, thereby providing a large clamping force.

According to the embodiment shown in FIG. 2, the worm wheel 24 is formed on the outer peripheral surface of the annular member 23. Since at least a part of the axial position of the worm wheel 24 coincides with the axial position of the inner peripheral surface formed on the rotatable table 11, the rotary table 20 can be shortened in the axial direction, thereby making the rotary table 20 thinner.

According to the embodiment shown in FIG. 2, the radially-outside tubular portion 54 and the radially-inside tubular portion 55 are separated by the circumferential groove 67, and the tubular portion 25 disposed in the circumferential groove 67 is provided to the rotatable table 11. The tubular portion 25 interposed between the tubular portion 54 and tubular portion 55 prevents the tubular portion 54 from tilting radially inward and being deformed and prevents the tubular portion 55 from tilting radially outward and being deformed to clamp the rotatable table 11.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

The brake structure of the rotary table according to the invention is effectively used in machine tools.

What is claimed is:

1. A brake structure of a rotary table comprising:
an inwardly facing peripheral surface and an outwardly facing peripheral surface that are coaxially formed on a rotatable table;
an outer stationary portion that is provided to a stationary member rotatably supporting the rotatable table and defines an outer hydraulic chamber; and
an inner stationary portion that is provided to the stationary member, is arranged radially inward from the outer stationary portion and defines an inner hydraulic chamber, wherein
the outer stationary portion comprises an outer braking member that is elastically deformed in a radial direction by expansion of the outer hydraulic chamber to push either the inwardly facing peripheral surface or the outwardly facing peripheral surface formed on the rotatable table, while the inner stationary portion comprises an inner braking member that is elastically deformed in a radial direction by expansion of the inner hydraulic chamber to push either the outwardly facing peripheral surface or the inwardly facing peripheral surface that is not pushed by the outer braking member.

2. The brake structure of the rotary table according to claim 1, wherein
the rotatable table is provided with a cylindrical sleeve extending along an axis of the rotatable table and having the inwardly facing peripheral surface and the outwardly facing peripheral surface, and
the outer braking member is arranged to face the outwardly facing peripheral surface of the sleeve to push the outwardly facing peripheral surface of the sleeve, while the inner braking member is arranged to face the inwardly facing peripheral surface of the sleeve to push the inwardly facing peripheral surface of the sleeve.

3. The brake structure of the rotary table according to claim 2, wherein an inward flange is formed at an end, on the side of the rotatable table, of the sleeve, and the inward flange includes a radially inner end section secured to the rotatable table.

4. The brake structure of the rotary table according to claim 3, wherein the outer hydraulic chamber is larger in the axial direction than the inner hydraulic chamber.

5. The brake structure of the rotary table according to claim 1, wherein
the rotatable table is provided with a shaft that extends along the axis of the rotatable table and includes the outwardly facing peripheral surface, and the rotatable table is provided with an annular member that is coaxially arranged with the axis of the rotatable table and includes the inwardly facing peripheral surface, and
the outer braking member is arranged to face the inwardly facing peripheral surface of the annular member to push the inwardly facing peripheral surface of the annular member, while the inner braking member is arranged to face the outwardly facing peripheral surface of the shaft to push the outwardly facing peripheral surface of the shaft.

6. The brake structure of the rotary table according to claim 5, wherein a worm wheel is formed on an outwardly facing peripheral surface of the annular member.

7. The brake structure of the rotary table according to claim 5, wherein the outer stationary portion and the inner stationary portion are separated by a circumferential groove, and the rotatable table is provided with a tubular portion that fits in the circumferential groove.

* * * * *

UNITED STATES PATENT AND TRADEMARK OFFICE
CERTIFICATE OF CORRECTION

PATENT NO. : 8,596,425 B2  
APPLICATION NO. : 13/359725  
DATED : December 3, 2013  
INVENTOR(S) : Yoshimoto et al.

Page 1 of 1

It is certified that error appears in the above-identified patent and that said Letters Patent is hereby corrected as shown below:

In the Specification

Column 4,  
Line 30, after "axis", replace "0" by --O--;  
Line 58, after "axis", replace "0" by --O--;

Column 7,  
Line 43, after "axis", replace "0" by --O--.

Signed and Sealed this  
Eleventh Day of February, 2014

Michelle K. Lee  
*Deputy Director of the United States Patent and Trademark Office*